United States Patent [19]

Wiegand

[11] 3,793,532

[45] *Feb. 19, 1974

[54] MULTIPLE PULSE GENERATOR

[75] Inventor: John Richard Wiegand, Valley Stream, Long Island, N.Y.

[73] Assignees: Milton Vilinsky, Plainfield, N.J.; John R. Wiegand, Valley Stream, N.Y.

[ * ] Notice: The portion of the term of this patent subsequent to Aug. 31, 1988, has been disclaimed.

[22] Filed: Aug. 19, 1971

[21] Appl. No.: 173,262

Related U.S. Application Data

[63] Continuation-in-part of Ser. No. 5,631, Jan. 26, 1970, Pat. No. 3,602,906, and a continuation-in-part of Ser. No. 86,169, Nov. 2, 1970, abandoned, and a continuation-in-part of Ser. No. 137,567, April 26, 1971, abandoned.

[52] U.S. Cl. 307/88 MP, 340/174 QB, 340/174 PM, 340/174 ZB, 307/282

[51] Int. Cl. .......... H03k 3/78

[58] Field of Search 340/174 QB, 174 ZB, 174 PM; 310/15; 307/88 MP, 282

[56] References Cited

UNITED STATES PATENTS

| | | | |
|---|---|---|---|
| 3,131,382 | 4/1964 | Valenta | 340/174 QB |
| 3,460,108 | 8/1969 | Bobeck | 340/174 QB |
| 3,483,537 | 12/1969 | Murray et al. | 340/174 QB |
| 3,129,418 | 4/1964 | De La Tour | 340/174 PM |
| 3,353,030 | 11/1967 | Michel | 340/174 PM |

*Primary Examiner*—Stanley M. Urynowicz, Jr.
*Attorney, Agent, or Firm*—Ryder, McAulay, Fields, Fisher & Goldstein

[57] ABSTRACT

A mulitple pulse generator comprises a plurality of axially straight, prestretched wire segments uniformly twisted helically and enclosed in a dielectric body to form a cylindrical core. A wire coil is wound around the core. When a magnetic field of variable intensity impinges on the wires a series of pulses are generated in the coil. The magnetic field can be created by passing an electric current of varying magnitude through another coil wound on the core, or by moving laterally a permanent magnet disposed adjacent to the core.

12 Claims, 5 Drawing Figures

MULTIPLE PULSE GENERATOR

This is a continuation-in-part application of the following copending applications: (a) Ser. No. 5,631, filed Jan. 26, 1970, U.S. Pat. No. 3,602,906 entitled "Multiple Pulse Magnetic Memory Unit;" (b) Ser. No. 86,169, filed Nov. 2, 1970, now abandoned entitled "Self-Nucleating Magnetic Wire" and (c) Ser. No. 137,567, filed Apr. 26, 1971, now abandoned entitled "Self-Nucleating Magnetic Wire."

The present invention concerns a multiple pulse generator and a method of generating multiple pulses.

The present invention concerns improvements over those described in my prior U.S. Pat. No. 3,223,987, dated Dec. 14, 1965. Typically magnetic memory cores, such as those used in computers, are circular and are magnetized in a path along the circumference of the core in either a clockwise or counterclockwise direction. When a read signal is applied a logical "1" pulse is generated if the magnetomotive force produced by the read current opposes the previous magnetic path. If the magnetomotive force produced by the read current does not oppose the previous magnetic path, there will be no read pulse output and this is regarded as a logical "0." The prior memory cores can thus be used to indicate only two logical states.

The present invention is directed at a memory device including a magnetic core by means of which a large number of pulses can be read from the core, thus increasing the utility and versatility of the device. The core comprises a cylindrical bundle of specially processed wires. An impinging magnetic field is used to read the signal. A sensing coil adjacent to the core picks up an electromotive force caused by sudden changes in flux intensity in the core. As the magnetic field is increased, a point will be reached where one of the wires snaps its magnetic domain into alignment with the impinging field. This action is regenerative within that individual wire so that the change in flux intensity (B) in the coil is sudden and relatively large. This output pulse then is independent of the rate or sweep of the magnetic field intensity. The step function increase in the magnetic field intensity is accompanied by a corresponding drop in magnetomotive force (H) across the core. The sweep will then have to continue the same amount until it passes once again that magnetomotive force that caused the first wire to snap its magnetic domain into alignment with the impinging field. Shortly after this point, another one of the wires will snap its magnetic domain into alignment with the impinging field. This process continues until all of the wires in the core have aligned their magnetic domains, and therefore, all of the output pulses have been registered by the sensing coil.

An important advantage of the invention is that a large predetermined number of output pulses can be derived from the core, determined by the number of wires in the core. The signal-to-noise ratio of the output pulses is quite high so that output pulses are picked up without ambiguity. Either positive or negative pulses can be obtained from the core depending on the direction (polarity) of the impinging magnetic field. The device is relatively simple in construction and employs components of high reliability. The generation of readout pulses can be effected electronically or electromechanically by a pushbutton type of construction. The construction of the core is such that the number, shape, amplitude and separation of the readout pulses can all be positively predetermined.

The invention will be explained in further detail with reference to the drawings, wherein.

Figures 1, 2, 3, 4, 5:
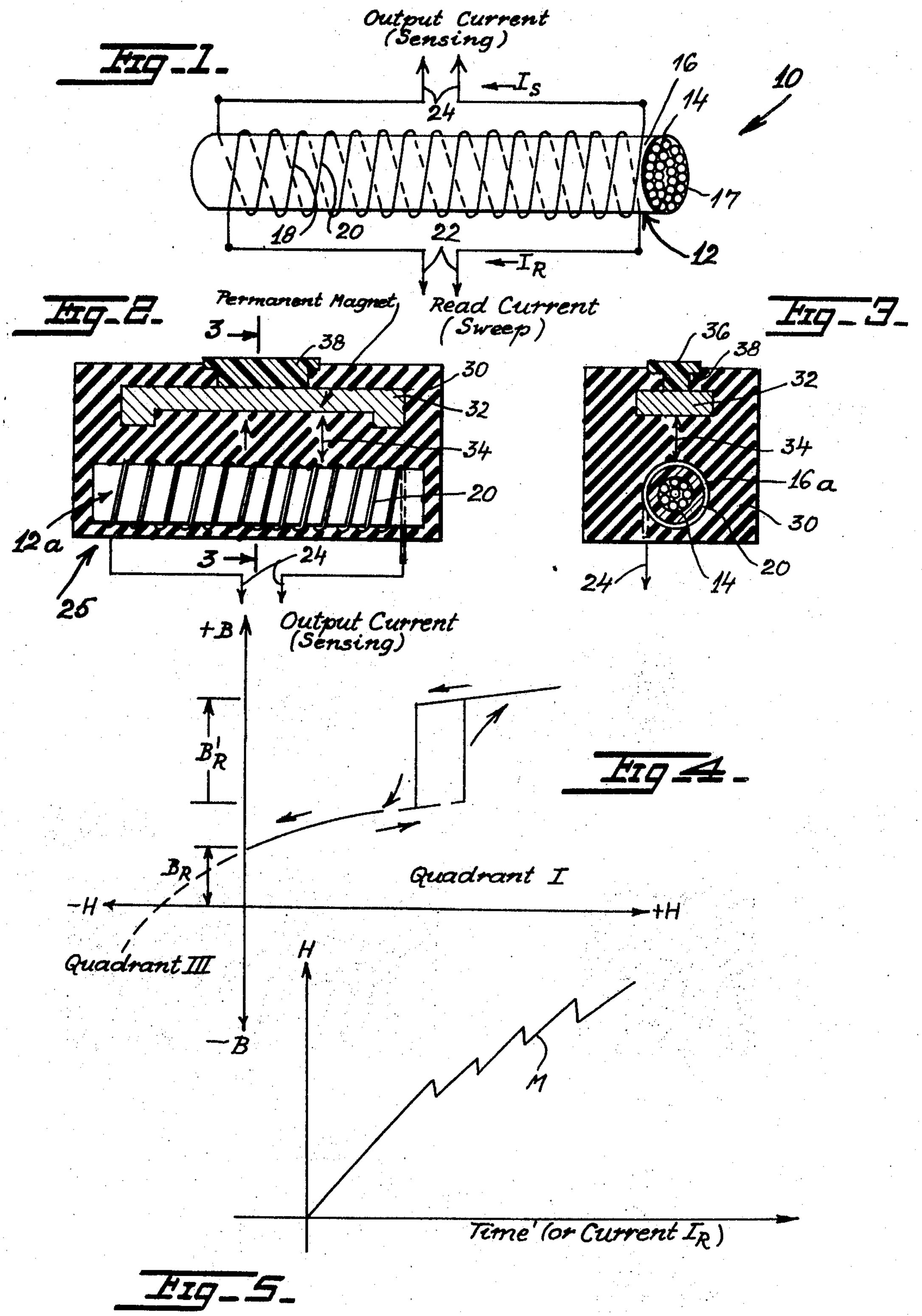
FIG. 1 is an oblique side view partially diagrammatic in form of one pulse generating device according to the invention.
FIG. 2 is a vertical longitudinal sectional view partially diagrammatic in form of another pulse generating device.
FIG. 3 is a cross sectional view taken on line 2—2 of FIG. 2.
FIGS. 4 and 5 are graphic diagrams used in explaining the theory of operation of the invention.

Referring first to FIG. 1, there is shown a pulse generating magnetic memory device 10 including a cylindrical core 12. The core contains a multiplicity of parallel wires 14 which, for relatively short wire structures, preferably are axially straight. The wires are permanently held together in a bundle by embedding them in a strong dielectric body 16 which may be made of epoxy or other plastic or a suitable cement.

Adjacent or surrounding the core are two conductive wire coils 18, 20 both wound in the same direction, extending the full length of the core, and insulated from each other. The coils have input and output terminals 22, 24 respectively. Coil 18 is used for applying a magnetizing field which provides the read in signal, and coil 20 senses reactions of the core wires and generates output current pulses.

The magnetic wires 14 of the core are made of a suitable ferromagnetic material and may be made of a commercially available nickel alloy, preferably one having a nickel-iron content with a higher percentage of nickel than iron. The wire, which has a diameter of approximately 0.012 inches, has a generally circular cross-section and preferably is as close to true round as can be reasonably obtained. The wire also is formed with a fine grain of not less than 6,000 grains per square millimeter and preferably with a grain size of at least 8,000 grains per square millimeter. For a given wire diameter, as its grain size is reduced, the slope of the portion of the B-H curve corresponding to alignment of the wire's magnetic domain with the impinging field increases (see FIG. 4) and the pulse sharpens. However, the resultant induced pulse width (body) in the sensing coil is reduced. Consequently, the optimum grain size is a function of the application in which the wire is used. For this application the preferred grain size is 10,000 grains per square millimeter when an alloy having 48 percent iron and 52 percent nickel is used and the wire diameter is approximately 0.012 inches.

The wire is treated to form a relatively "soft" magnetic central portion and a relatively "hard" magnetic outer portion (shell) having different net magnetic characteristics. The central portion is magnetically anisotropic with an easy axis of magnetization parallel to the wire axis and has a relatively low magnetic retentivity and coercivity. The shell has a relatively high magnetic retentivity and coercivity and is magnetically anisotropic with an axis of magnetization parallel to the wire axis. The shell is magnetized to form north and south poles at its opposite ends and the shell magnetizes the central portion in a direction opposite to the shell whereby the central portion forms a magnetic return path or shunt for the shell.

The core 12 can be made by drawing the wire 14 to substantially the desired size while it is maintained at a suitable elevated temperature to form a wire with a desired fine grain. For example, a 48 percent iron - 52 percent nickel alloy wire of approximately 1 inch – 1½ inches diameter is drawn by passing the wire through successive drawing stations at approximately 75 ft./min. which individually provide for a 20 percent reduction in cross-sectional area. The wire is work hardened at room temperature to harden the wire shell while maintaining the central portion relatively soft and the shell then is magnetized in the desired direction. The wire can be hardened by stretching the wire slightly (e.g., 2½ percent) and then twisting the wire while the wire is in tension so that the wire assumes a helical form with equally spaced turns.

The wire is then cut into segments of equal length, each equal to the length of core being made. A number of cut wire segments 14 are then grouped together to form a cylindrical bundle. The number of wires 14 will be determined by and be equal to the maximum desired number of output pulses during each readout cycle. The wires are then permanently bound together parallel to each other by embedding them in a suitable dielectric plastic body 15 or other potting compound. Opposite ends 17 of the core may then be ground to form smooth end surfaces. Coils 18 and 20 made of copper wire are then wound on the core in the same direction and may be cemented in place.

FIG. 1 illustrates a memory device arranged for electronic operation. When output pulses are desired $I_R$ may be increased in a continuous fashion. This will induce a varying magnetomotive force in core 12, causing output current pulses $I_S$ to be generated in coil 24. As the absolute value of the read signal current $I_R$ is increased to just past the point where the first pulse is generated due to magnetic response of a signal one of the wires 14, the current $I_R$ can be reversed so that no further pulses in the series will be read. The current $I_R$ can be increased continuously until all the output pulses which the device can be produced in a series have been generated. For proper operation, core 12 must be initially primed with larger than normal positive and negative currents in the read coil 18. Thereafter normal sweep currents may be used in read coil 18 to produce output pulses in coil 20.

FIGS. 2 and 3 show another embodiment of the invention which is electromechanical in operation. Memory device 25 includes cylindrical core 12a constructed and arranged like core 12 of FIG. 1, with a multiplicity of twisted, parallel wires 14 collected together to form a cylindrical bundle and held together permanently in a dielectric body 16a. The core is surrounded by a single sensing or pickup coil 20. The coil terminates in output terminals 24. The entire assembly of core and coil is then embedded in a flexible dielectric block 30. A permanent bar magnet 32 is also embedded in the block parallel to core *12a* and spaced apart by a flexible section 34 of the block. A rigid button plate 36 is inserted in a cavity 38 on top of the block and contacts magnet 32.

When button 36 is depressed the spacing of magnet 32 from core 12a is changed as section 24 of the block flexes. A magnetic field then impinges on the core to create a magnetomotive force which activates the wires 14. As the magnetic domain of the magnetic wires align in succession with the impinging magnetic field, a series of output pulses is electromagnetically generated in pickup or sensing coil 20. When the button 36 is released, the series of pulses is again generated.

The theory of operation will be described with reference to FIGS. 4 and 5. When a wire is helically twisted like each of wires 14, an easy path for magnetization is created. When this wire is initially magnetized or primed, all of the magnetic domains are aligned in a linear direction; but as the magnetomotive force H recedes at a particular point all of the domains snap into the helix pattern regeneratively, or as a chain reaction within the wire. This then amounts to a residual magnetism $B'_R$ in a helix form; see FIG. 4. A B-H plot is shown in FIG. 4 for a linear wire 14, where B is the flux intensity and H is the magnetomotive force. A hysteresis effect is shown in quadrant I. The same action can, however, be accomplished in the third quadrant where both B and H will be reversed after first priming with a -H force.

No two wires 14 in core 12 or 12a will snap coincidentally because as one wire switches it tends to short circuit the other wires in the core. This step effect is indicated by the step plot M of an entire core shown in FIG. 5. The positioning of the group of pulses with respect to the impinging field H caused by the sweep current $I_R$ or by pushing button 36, is determined primarily by the type of materials employed in the wires 14. The separation of the pulses within each group is a function principally of both the material of the wires and the amount of twist applied to the wire. The greater the number of turns per unit length of wire, the closer together will be the pulses. The magnitude of the change in flux $B_R$ indicated in FIG. 4, caused by the snap of magnetic domain into alignment with the impinging field, is in the main influenced by the amount of initial stretching of the wires prior to twisting and the wire grain size.

To summarize, the invention has in general the following characteristics:

1. The magnetic flux flow switches between two different magnetic paths thereby creating an electromotive pulse in the sense coil.
2. This switch is caused by an impinging magnetomotive force field with directivity which is different from the easy quiescent field.
3. The magnetomotive force field can be generated electronically by sweeping a read current signal in the magnetic core, or the magnetomotive force field can be generated by varying the spacing between the core and a permanent magnet.
4. The switch of magnetic flux flow in a path occurs sharply and rapidly and is independent of the sweep rate of the read signal or the rate of change of separation between the core and magnet.
5. Due to the rapid switching, the signal-to-noise ratio in the sensing coil is quite high.
6. A series of output pulses are produced from a multiwire core because a multiplicity of magnetic switching actions occur.
7. The amplitude, separation, location and number of pulses in a series are all variable and determinable by the material of the wire, wire diameter, amount of twist, amount of stretch, grain size, etc.
8. The read signal sweep can be reversed at such a point that less than a full series of pulses are produced.

9. The magnetic switching phenomena traces a hysteresis path in one of two quadrants of a B-H plot of magnetization.

10. Either positive or negative output pulses can be generated from a core, and no two output pulses will occur simultaneously.

The memory devices described constitute information storage and readout units of high reliability. Each unit of a system may have identical circuitry and/or mounting fixtures, and physically equivalent cores, irrespective of the number or characteristics of the output multiplexing system where all of the pushbutton units feed one common wire and yet each unit will transmit distinctive signals. The units can be used in any magnetic core memory system or computer where it is desirable to read more than a logical 0 and logical 1 for a memory unit. If desired, fixtures containing the memory cores can be arranged so that individual magnetic cores mounted therein can be easily removed and replaced with others so that a different number of pulses can be obtained from each fixture. In fabricating the core it is possible to stretch and twist the wire segments individually before forming them into a cylindrical core.

What is claimed is:

1. A multiple pulse generator comprising a plurality of magnetic wires, each wire having a central portion of relatively low magnetic retentivity and coercivity and an outer shell of relatively high magnetic retentivity and coercivity, the shell having a magnetic field adapted for magnetizing the central portion in a first generally axial direction such that the magnetization of the central portion is reversible by application of a second magnetic field of at least a predetermined magnitude and the magnetic field of the shell is operable to remagnetize the central portion in said first direction upon reduction of said second magnetic field below said predetermined magnitude, dielectric means securing the wires in a bundle in fixed laterally adjacent positions to form a cylindrical core, and first means adjacent to the core to sense flux changes whereby a series of electrical pulses will be generated in said first means when the wires are subjected to a second magnetic field of at least said predetermined magnitude, the maximum number of pulses in said series being equal to the number of wires in the core.

2. A multiple pulse generator as defined in claim 1 wherein said wires have a uniform helical twist and are of equal length.

3. A multiple pulse generator as defined in claim 1 where said wires are axially straight.

4. A multiple pulse generator as defined in claim 1 wherein said first means comprises a conductive wire coil adjacent to the core.

5. A multiple pulse generator as defined in claim 1 further comprising second means adjacent to the core for creating said magnetic field.

6. A multiple pulse generator as defined in claim 5 wherein the second means comprises a field generating conductive wire coil wound around the core to create said magnetic field when an electric current is passed through said field generating coil.

7. A multiple pulse generator as defined in claim 5, wherein the second means comprises a permanent magnet spaced laterally from said core, and means for changing the spacing between the magnet and core for subjecting the core to the magnetic field of the permanent magnet.

8. A multiple pulse generator as defined in claim 1 further comprising a support for the core; a permanent magnet, means movably supporting the magnet with respect to the core; and means for moving the permanent magnet laterally of the core to subject the core to the magnetic field of the permanent magnet.

9. A multiple pulse generator as defined in claim 1 further comprising a permanent magnet; a flexible dielectric block enclosing both said core and magnet with the magnet spaced laterally from the core, whereby a magnetic field maintained by the magnet sweeps the core when the magnet and core are moved relatively to each other inside said block.

10. A multiple pulse generator as defined in claim 8 further comprising a button on the block arranged to move the permanent magnet laterally with respect to the core.

11. A method for generating an electric pulse comprising the steps of:

providing a multiple pulse generator having a plurality of magnetic wires, each wire having a central portion of relatively low magnetic retentivity and coercivity and an outer shell of relatively high magnetic retentivity and coercivity, said shell being magnetized and having a magnetic field magnetizing said central portion in a first generally axial direction, the magnetization of said central portion being reversible by application of an external magnetic field of at least a predetermined magnitude and direction, the magnetic field of the shell magnetizing said central portion in said first direction upon reduction of said second magnetic field below said predetermined magnitude, dielectric means securing the wires in a bundle in fixed laterally adjacent positions to form a cylindrical core, and first means adjacent to said core to sense flux changes, subjecting said wires to a second magnetic field, and increasing the magnitude of said second magnetic field and to above said predetermined magnitude.

12. A method for generating an electric pulse comprising the steps of:

providing a multiple pulse generator having a plurality of magnetic wires, each wire having a central portion of relatively low magnetic retentivity and coercivity and an outer shell of relatively high magnetic retentivity and coercivity, said shell being magnetized and having a magnetic field magnetizing said central portion in a first generally axial direction, the magnetization of said central portion being reversible by application of an external magnetic field of at least a predetermined magnitude and direction, the magnetic field of the shell magnetizing said central portion in said first direction upon reduction of said second magnetic field below said predetermined magnitude, dielectric means securing the wires in a bundle in fixed laterally adjacent positions to form a cylindrical core, and first means adjacent to said core to sense flux changes, subjecting said wires to a second magnetic field having a magnitude above said predetermined magnitude, and reducing the magnitude of said second magnetic field below said predetermined magnitude.

* * * * *